United States Patent
Rosenkrantz

(10) Patent No.: US 9,626,574 B2
(45) Date of Patent: Apr. 18, 2017

(54) BIOMETRIC NOTIFICATION SYSTEM

(71) Applicant: FACEFIRST, LLC, Westlake Village, CA (US)

(72) Inventor: Joseph Ethan Rosenkrantz, Calabasas, CA (US)

(73) Assignee: FaceFirst, Inc., Westlake Village, CA (US)

( * ) Notice: Subject to any disclaimer, the term of this patent is extended or adjusted under 35 U.S.C. 154(b) by 0 days.

(21) Appl. No.: 14/612,207

(22) Filed: Feb. 2, 2015

(65) Prior Publication Data

US 2015/0154462 A1    Jun. 4, 2015

Related U.S. Application Data

(63) Continuation of application No. 12/177,103, filed on Jul. 21, 2008, now Pat. No. 9,141,863.

(51) Int. Cl.
| | | |
|---|---|---|
| *G06K 9/00* | (2006.01) | |
| *H04N 5/44* | (2011.01) | |
| *H04N 7/18* | (2006.01) | |
| *G06F 17/30* | (2006.01) | |
| *G06K 9/62* | (2006.01) | |

(52) U.S. Cl.
CPC ..... *G06K 9/00885* (2013.01); *G06F 17/3028* (2013.01); *G06F 17/30247* (2013.01); *G06K 9/00268* (2013.01); *G06K 9/00979* (2013.01); *G06K 9/6202* (2013.01); *G06K 9/6215* (2013.01); *H04N 5/44* (2013.01); *H04N 7/18* (2013.01)

(58) Field of Classification Search
CPC .......... G06K 9/00885; G06F 17/30247; G06F 17/3028; H04N 5/44; H04N 7/18
See application file for complete search history.

(56) References Cited

U.S. PATENT DOCUMENTS

| | | | |
|---|---|---|---|
| 6,182,076 B1 | 1/2001 | Yu et al. | |
| 6,411,328 B1* | 6/2002 | Franke | ..... G08G 1/04 340/937 |
| 6,819,783 B2 | 11/2004 | Goldberg et al. | |
| 6,898,299 B1* | 5/2005 | Brooks | ..... G06K 9/00 340/5.52 |
| 7,099,899 B2 | 8/2006 | Choy et al. | |
| 7,277,891 B2 | 10/2007 | Howard et al. | |
| 7,292,723 B2* | 11/2007 | Tedesco | ..... G06F 17/30256 340/541 |
| 7,369,685 B2 | 5/2008 | DeLean et al. | |
| 7,421,155 B2* | 9/2008 | King | ..... G06F 17/30864 382/312 |
| 7,472,135 B2* | 12/2008 | Huuskonen | ..... G06Q 10/109 |
| 7,593,605 B2 | 9/2009 | King et al. | |
| 7,634,063 B2* | 12/2009 | Mardirossian | ..... H04L 63/0861 379/35 |

(Continued)

FOREIGN PATENT DOCUMENTS

| | | |
|---|---|---|
| JP | 2002-229955 A | 8/2002 |
| JP | 2006-260603 A | 9/2006 |
| JP | 2007-249594 A | 9/2007 |

*Primary Examiner* — Vu Le
*Assistant Examiner* — Mia M Thomas
(74) *Attorney, Agent, or Firm* — Paul D. Chancellor; Ocean Law

(57) ABSTRACT

A biometric notification system compares images or indicia of images and where there is a match provides a notification of the same.

4 Claims, 13 Drawing Sheets

(56) References Cited

U.S. PATENT DOCUMENTS

| | | |
|---|---|---|
| 7,647,595 B2 | 1/2010 | Chandrasekaran |
| 7,680,912 B1 | 3/2010 | McNabb et al. |
| 7,720,463 B2 | 5/2010 | Marsico et al. |
| 7,772,972 B2 | 8/2010 | Kuroda et al. |
| 7,933,451 B2 | 4/2011 | Kloer et al. |
| 7,999,857 B2 | 8/2011 | Bunn et al. |
| 8,131,012 B2* | 3/2012 | Eaton .................. G06K 9/00771 340/573.1 |
| 8,308,562 B2 | 11/2012 | Patton |
| 8,601,494 B2* | 12/2013 | Brown ................... G06Q 10/10 715/700 |
| 8,774,471 B1 | 7/2014 | Laaser et al. |
| 9,208,675 B2* | 12/2015 | Xu ......................... H04N 7/002 |
| 9,317,908 B2* | 4/2016 | Seow ....................... G06T 5/009 |
| 9,373,055 B2* | 6/2016 | Cobb .................... G06K 9/4661 |
| 9,507,768 B2* | 11/2016 | Cobb .................... G06N 99/005 |
| 2002/0194287 A1 | 12/2002 | Tyra et al. |
| 2003/0084305 A1 | 5/2003 | Siegel et al. |
| 2003/0126121 A1 | 7/2003 | Khan et al. |
| 2003/0133614 A1 | 7/2003 | Robins et al. |
| 2003/0163233 A1 | 8/2003 | Song et al. |
| 2004/0031856 A1 | 2/2004 | Alsmon |
| 2004/0064453 A1 | 4/2004 | Ruiz et al. |
| 2004/0133582 A1 | 7/2004 | Howard et al. |
| 2004/0151347 A1 | 8/2004 | Wisniewski |
| 2004/0156535 A1 | 8/2004 | Goldberg et al. |
| 2004/0161133 A1* | 8/2004 | Elazar ................... G01S 3/7864 382/115 |
| 2004/0263314 A1* | 12/2004 | Dorai ...................... G06F 21/32 340/5.2 |
| 2005/0104727 A1* | 5/2005 | Han .................... G06K 9/00335 340/541 |
| 2005/0110637 A1 | 5/2005 | Rao |
| 2005/0138042 A1* | 6/2005 | Foo ......................... G06Q 30/06 |
| 2005/0207622 A1 | 9/2005 | Haupt et al. |
| 2005/0271250 A1 | 12/2005 | Vallone et al. |
| 2005/0273621 A1* | 12/2005 | Davis ...................... G06Q 10/10 713/182 |
| 2005/0273627 A1 | 12/2005 | Davis |
| 2005/0283617 A1 | 12/2005 | Davis |
| 2005/0288952 A1 | 12/2005 | Davis |
| 2006/0016107 A1 | 1/2006 | Davis |
| 2006/0020630 A1* | 1/2006 | Stager ................. G06K 9/00993 |
| 2006/0024655 A1* | 2/2006 | Bambrick ................ G09B 7/02 434/350 |
| 2006/0029296 A1* | 2/2006 | King ...................... G06K 9/228 382/313 |
| 2006/0092278 A1* | 5/2006 | Kondo .................. B60R 25/1004 348/152 |
| 2006/0161588 A1 | 7/2006 | Nomoto |
| 2006/0190419 A1 | 8/2006 | Bunn et al. |
| 2007/0122003 A1* | 5/2007 | Dobkin ............ G08B 13/19608 382/115 |
| 2007/0124785 A1 | 5/2007 | Marsico et al. |
| 2007/0157018 A1* | 7/2007 | Simon ..................... H04M 11/04 713/100 |
| 2007/0183661 A1* | 8/2007 | El-Maleh ........... G06K 9/00234 382/173 |
| 2007/0248244 A1* | 10/2007 | Sato .................. G06F 17/30265 382/103 |
| 2007/0273497 A1 | 11/2007 | Kuroda et al. |
| 2008/0082546 A1 | 4/2008 | Meijer et al. |
| 2008/0169919 A1 | 7/2008 | Sato et al. |
| 2009/0092283 A1* | 4/2009 | Whillock ............ G06K 9/00771 382/103 |
| 2009/0110246 A1 | 4/2009 | Olsson et al. |
| 2009/0141940 A1 | 6/2009 | Zhao et al. |
| 2009/0169116 A1 | 7/2009 | Iizuka et al. |
| 2009/0243844 A1 | 10/2009 | Ishidera |
| 2009/0248587 A1 | 10/2009 | Van Buskirk |
| 2009/0270170 A1 | 10/2009 | Patton |
| 2009/0327288 A1 | 12/2009 | Silverman et al. |
| 2010/0014717 A1 | 1/2010 | Rosenkrantz |
| 2010/0142764 A1 | 6/2010 | Ikegami |
| 2010/0303340 A1* | 12/2010 | Abraham ............... G06T 7/0075 382/154 |
| 2010/0316262 A1 | 12/2010 | Kuwahara |
| 2010/0318417 A1 | 12/2010 | Brisebois et al. |
| 2011/0013810 A1* | 1/2011 | Engstrom .......... G06K 9/00288 382/118 |
| 2011/0026781 A1* | 2/2011 | Osadchy ................. H04L 9/008 382/118 |
| 2011/0267298 A1* | 11/2011 | Erhart .................... G06F 1/1626 345/173 |
| 2012/0300081 A1* | 11/2012 | Kim .................. G08B 13/19656 348/159 |
| 2013/0259329 A1* | 10/2013 | Wickboldt ............. H05K 1/189 382/124 |
| 2014/0132772 A1* | 5/2014 | Billau ................. G08B 13/19682 348/159 |
| 2014/0133831 A1* | 5/2014 | Billau ...................... H04N 5/76 386/262 |
| 2014/0136701 A1* | 5/2014 | Billau .................... H04N 7/162 709/225 |
| 2014/0162598 A1* | 6/2014 | Villa-Real ............... H04M 1/66 455/411 |
| 2014/0313330 A1* | 10/2014 | Carey ................ G08B 13/19613 348/143 |
| 2014/0347479 A1* | 11/2014 | Givon ................ G06K 9/00342 348/143 |
| 2015/0324570 A1* | 11/2015 | Lee ........................ G06F 21/32 382/124 |

* cited by examiner

BIOMETRIC NOTIFICATION SYSTEM

PRIORITY CLAIM AND INCORPORATION BY REFERENCE

This application is a continuation of U.S. patent application Ser. No. 12/177,103 filed Jul. 21, 2008 and titled MANAGED BIOMETRIC-BASED NOTIFICATION SYSTEM AND METHOD which is incorporated herein in its entirety and for all purposes.

BACKGROUND

Field of the Invention

The invention relates to a notification system. More particularly, the invention relates to systems and methods of managed biometric-based notification.

Discussion of the Related Art

Retail crime, shoplifting, and fraud are increasing in the United States. This increase brings a rising incidence of violence. In 2006, it was reported that the value of property lost in such cases, excluding shoplifting, was $18 billion. Shoplifting resulted in a $40 billion loss that same year, totaling $58 billion in 2006. Some suggest that part of the problem has been the "professionalism" of retail theft, which connotes well organized individuals or gangs stealing large quantities of merchandise. Many surveillance systems are currently being used to combat such crime, but the most effective systems are those which utilize biometric components.

Biometrics is the study of methods for characterizing and recognizing an individual based upon physical and behavioral traits, or in other words, a system which uses measurable biological properties to identify individuals. Physical traits are those related to the characteristics of the human body, e.g. fingerprints, iris geometry, and face recognition. Behavioral traits are those linked to a signature, voice or keystroke. It is because biometrics measures qualities that an individual cannot change, that it is most effective for authentication and identification purposes.

Biometrics are an increasingly important part of the tool set used to securing a wide range of retail stores, facilities, areas, information, and environments. Use of biometric-based identification systems increases because such systems can provide substantially more security than many traditional security systems (e.g., usernames, passwords or personal identification numbers). Face recognition technologies can be used, for example, to determine whether an individual is permitted entry into a home, office, or similar environment, or to determine if an individual is wanted.

Generally, in what is known as "one-to-many match," and prior to a biometric feature extraction process, an analog or digital representation of biometric characteristics are obtained from a biometric capture device. Many conventional systems rely on digital imaging technologies to capture data, which can include optics, a camera, or other electronic equipment. The digital representation of the images (i.e., the raw or unprocessed image data) is then processed by an algorithm that converts the image data into a particular representation (i.e., a biometric marker or template).

Biometric features are information processed or extracted from a biometric sample or samples, which can then be used for comparison with a stored biometric reference. From the recognition sample, the biometric feature extraction creates a template which is compared with one or multiple biometric templates from a database. Due to the statistical nature of biometric samples, there is generally no exact match possible. For that reason, the decision process will only assign the biometric data subject to a biometric template and confirm recognition if the comparison score exceeds an adjustable threshold. Face recognition works by using a computer to analyze an individual's facial structure. The biometric software takes a number of points and measurements, including the distances between characteristics such as eyes, nose and mouth. This may also include angles of certain features such as the jaw and forehead, and lengths of various portions of the face.

Research today focuses on developing software or algorithms for biometric identification. The developing algorithms aim to reduce a known problem in the art, namely, the high numbers of false positives and negatives, which are called the False Acceptance Rate (FAR) and the False Recognition Rate (FRR), considered Type I and Type II errors in statistical models. The technologies involved in biometric identification include Segmentation, Decomposition Methods, namely, Eigenface, Local Feature Analysis (LFA), and Independent Component Analysis (ICA), and also include Support Vector Machines, Elastic Bunch Grapes, Implicit 3-D models and methods.

While more accurate and precise algorithms are essential to the identification of an individual, the implementation of current systems generally result in an inability to properly disseminate information. Furthermore, current systems are deficient in their implementation in a real-time environment using current technology network components. This deficiency stems from a lack of control over the environment, user integration and management over the system network.

BRIEF DESCRIPTION OF THE DRAWINGS

The invention is described by way of example with reference to the accompanying drawings wherein.

DETAILED DESCRIPTION OF THE INVENTION

A managed biometric-based notification system 100 is provided. What is disclosed herein can include, among other things, a user interactive feedback system which is over a communication medium such as the Internet. The techniques described below include a computer software application which, when executed on the computer system of an user, configures that computer system so that the user can receive and provide information to other selected users or groups of users based on the result of a content comparison.

As used herein, the Internet refers at least to the world-wide collection of networks and gateways that use the transmission control protocol/Internet protocol (TCP/IP) to communicate. The World Wide Web (WWW) refers to the total set of inter-linked hypertext documents residing on hypertext transport protocol (HTTP) servers, wherein web servers can be any type of web server, e.g. APACHE. As used herein, the WWW also refers at least to documents accessed on secure servers, such as HTTP servers (HTTPS), which provide for encryption and transmission through a secure port. As used herein, the term "web site" refers at least to one or more related HTML documents and associated files, scripts, and databases that can be presented by an HTTP or HTTPS server on the WWW. The term "web browser" refers at least to software that lets a user view HTML documents and access files and software related to those documents.

It should be appreciated that any one or more elements of the system illustrated in the following embodiments can be located remotely from any or all of the other elements, and that any of the elements of a given embodiment can, in fact, be part of another system altogether. Furthermore, it should be understood that, for the following embodiments, although they are described in connection with the managed biometric based identification system 100, many aspects of the invention are usable with other biometric technologies, including but not limited to fingerprint recognition systems, iris recognition systems, hand geometry systems, and signature recognition systems. At least some embodiments of the invention are especially advantageous for biometric applications that utilize information captured from an image.

Figure 1:
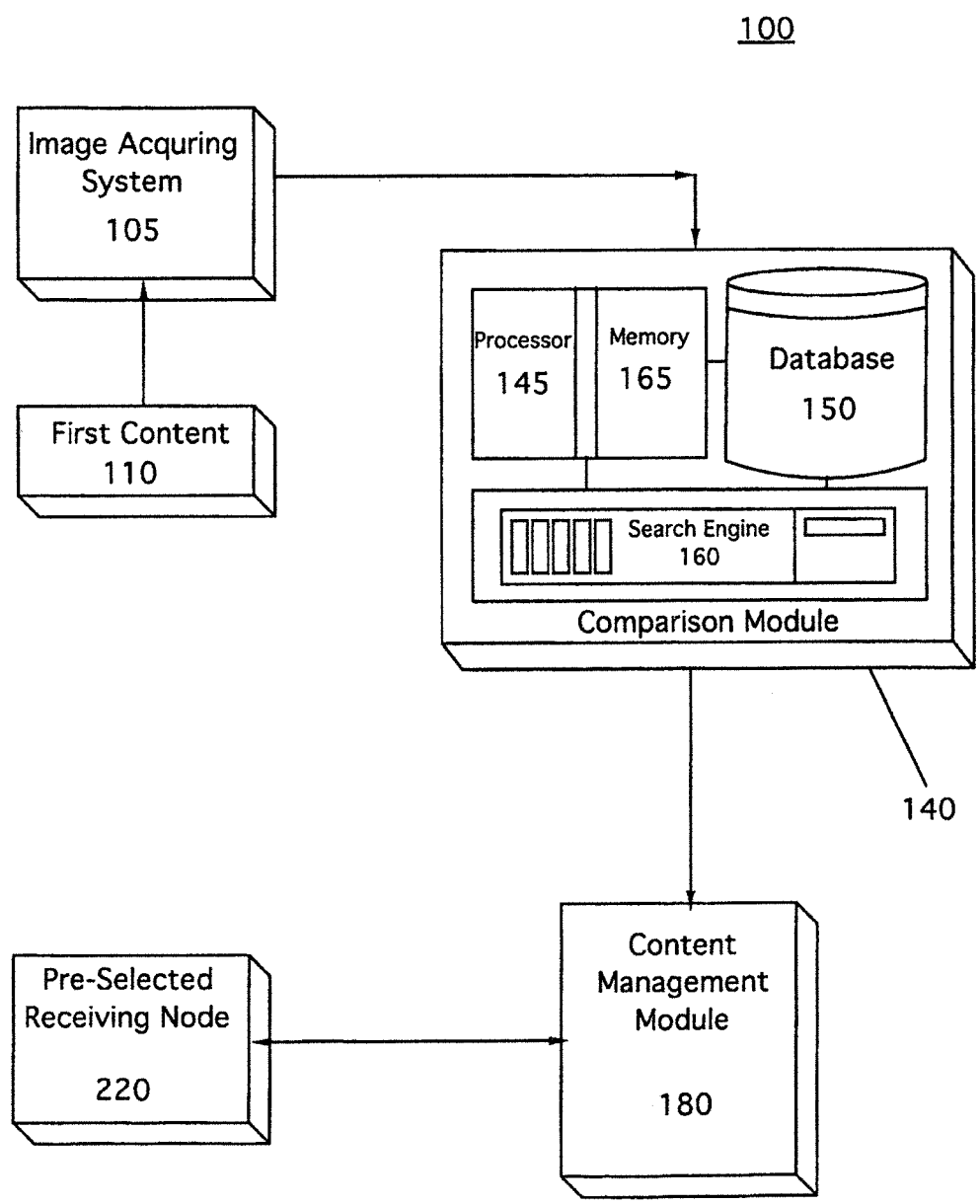
FIG. 1 is a block diagram of a managed biometric-based notification system.

FIG. 1 illustrates the managed biometric-based notification system 100. The managed biometric-based notification system 100 includes at least one image acquiring system 105 which is adapted to capture a first content 110, a comparison module 140 for comparing and distributing content within the system 100, a content management module 180 for controlling and managing the system 100, and at least one pre-selected receiving node 220.

Figure 2:
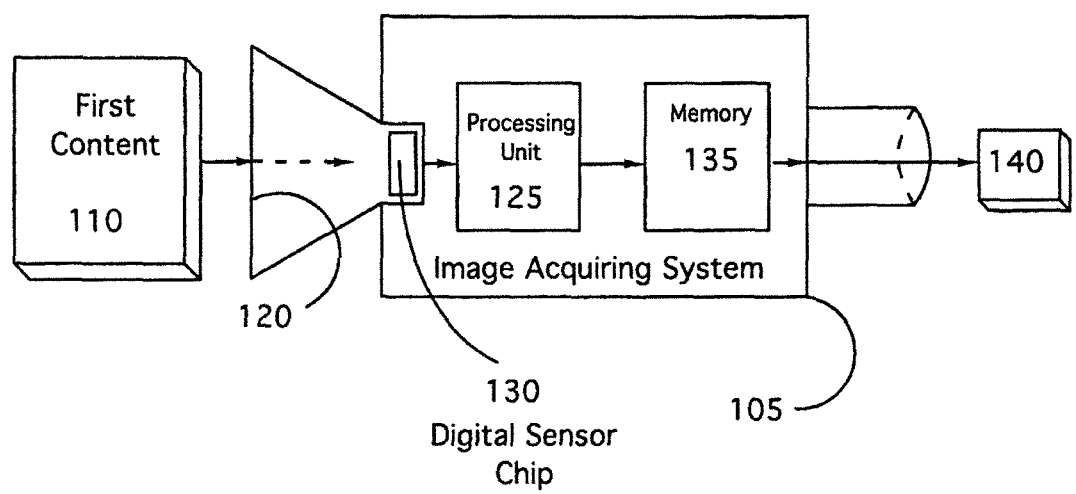
FIG. 2 is a block diagram of at least one image acquiring system of the managed biometric-based notification system, adapted to capture a first content.

FIG. 2 illustrates the at least one image acquiring system 105 in more detail. The at least one image acquiring system 105 includes a lens 120, a processing unit 125, a digital sensor chip 130, a memory 135, and is adapted to capture the first content 110. The first content 110 is captured the by the at least one image acquiring system 105 and transmitted to the comparison module 140 of the managed biometric-based notification system 100.

Figure 3:
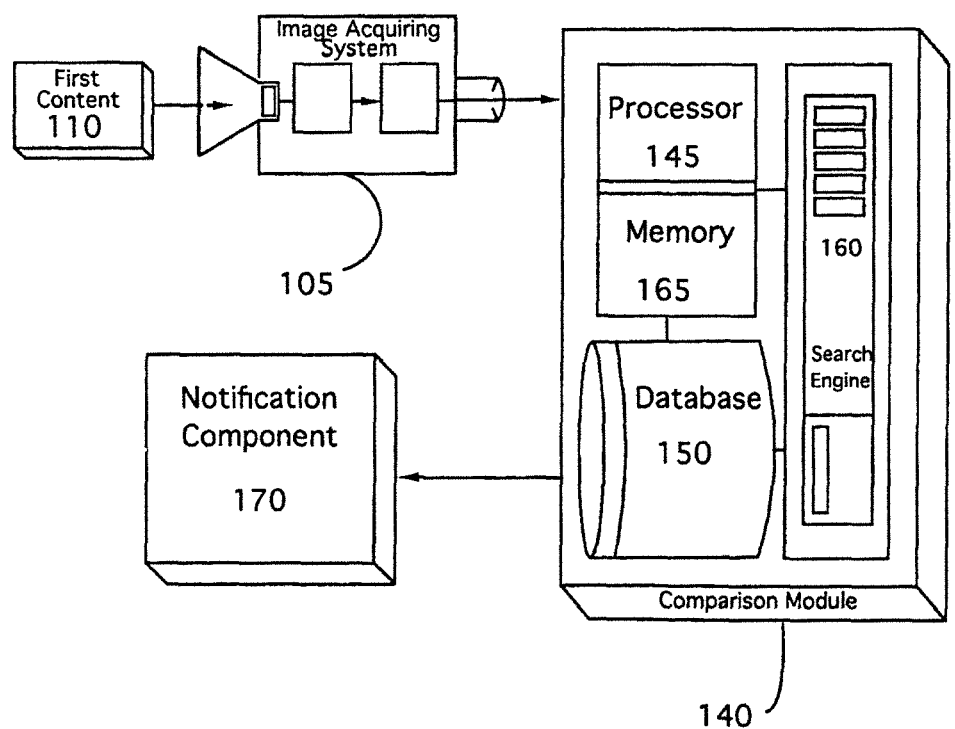
FIG. 3 is a block diagram of the managed biometric-based notification system including at least one image acquiring system, a comparison module, and a notification component.

FIG. 3 illustrates the comparison module 140 in more detail, and a notification component 170. The comparison module 140 is configured to receive the first content 110, and includes at least one processor 145, at least one database 150, at least one search engine 160, and an associated memory 165. The at least one search engine 160 is operatively coupled with the at least one image acquiring system 105 and the at least one database 150. The at least one processor 145 is operatively coupled with the at least one image acquiring system 105 and the at least one search engine 160, wherein the notification component 170 is generated provided a statistical threshold is satisfied between compared content.

Figure 4:
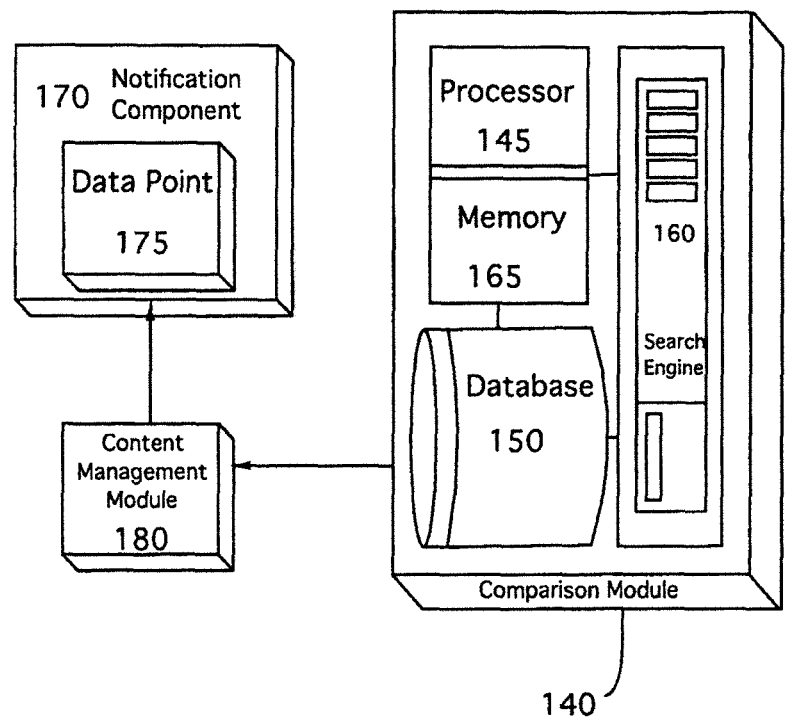
FIG. 4 is a block diagram of the managed biometric-based notification system including the comparison module, a content management module, and the at least one notification component including at least one transmitted data point.

FIG. 4 illustrates the comparison module 140, the content management module 180, the notification component 170, and at least one transmitted data point 175. The notification component 170 is transmitted by the comparison module 140 after the first content 110, and a second content 155, located in at least one database 150 are compared. The content management module 180 is configured to manage and control the distribution of the notification component 170 including the at least one transmitted data point 175, to the user or users of the system 100.

Figure 5:
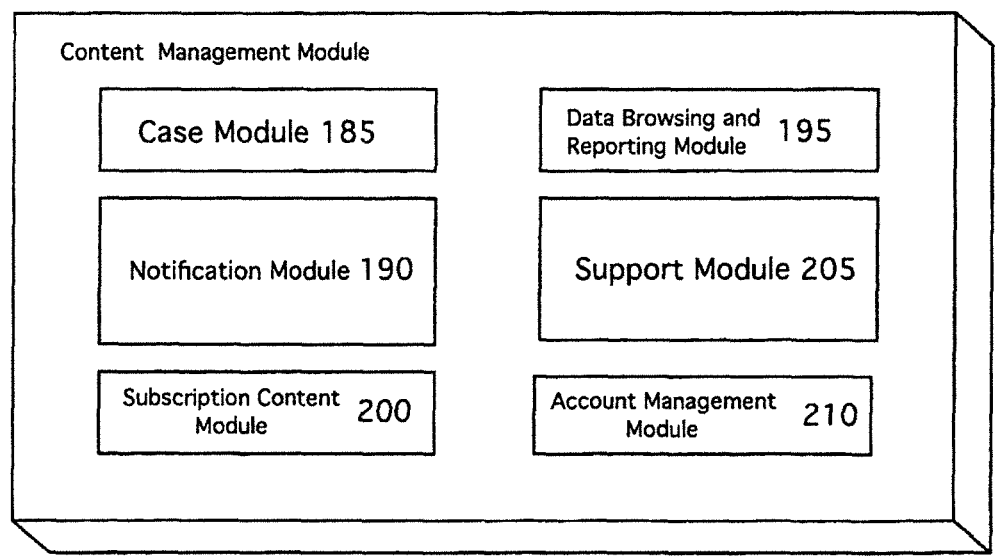
FIG. 5 is a detailed block diagram of the content management module.

FIG. 5 illustrates the content management module 180 in detail. The content management module 180 provides the means for managing and controlling the managed biometric-based notification system 100 functioning by interacting with the comparison module 140. In providing the necessary functionality to the user of the system 100, the content management module 180 includes a case module ("CM") 185, a notification module ("NM") 190, a database browsing and reporting module ("DBRM") 195, a subscription content module ("SCM") 200, a support module ("SM") 205, and an account management module 210 ("AMM").

The content management module 180 serves as a graphical user interface (GUI), and provides the user interaction, feedback functionality, and the ability to control and manage the managed biometric-based notification system 100. In an embodiment, the content management module 180 is accessed through a network via a web portal. The content management module 180 is embodied in a computer-readable executable program comprising computer executable instructions stored on computer readable media, and is usable with a general purpose computer system. In another embodiment, the content management module 180 is embodied in a transmission medium, such as one or more carrier wave signals transmitted between computers and a server, on a wireless network.

The CM 185 is a module configured to allow the user to manage and create content and information for the managed biometric-based notification system 100. The CM 185 provides the ability to create case information and associated case identification numbers ("CIN"), and also provide the user the ability to modify case information. The user is able to create cases by "enrollment" of the first content 110 captured from the at least one image acquiring system 105. Enrollment is a process of collecting biometric data from an individual and subsequently storing the data in a reference template representing the individual's identity. The procedure is crucial where the user is familiar with an individual who is not otherwise recognized by the system 100. The created content is then stored in the at least one database 150 of the comparison module 140.

CM 185 provides the ability to also update the second content 155 with the first content 110, provided the threshold or substantial similarity requirement is met. This feature is essential where the managed biometric-based notification system 100 has outdated information and current information is available from the environment. The CM 185 is also configured to allow the user to group case information based on specific criteria. For example, a "case group" can be labeled "shoplifters," very important persons," or "persons with records." Generally, the case group can be defined as any group where identification is important to the surrounding environment.

The CM 185 also manages stored content. The CM 185 generally contains all the functionality of an arrangement module within a database. The functionality contains fields, which can also be used to search stored content (see DBRM 195), use menus, and tab functionality for arranging information. The contained fields can include name, date of birth, sex, offense list, history, observations, transactions, and interactions in the environment. However, more fields can be added that may be specific to an individual or the environment, in order to better define the content and enhance search capabilities (see DBRM 195).

The NM 190 is a module configured to provide the user the means for notifying at least one user of the biometric-based notification system 100. The NM 190, in conjunction with the comparison module 140, allows the user to select different methods of interacting with the users of the system 100. The notification component 170 can be transmitted based on user preferences or pre-selected input into the NM 190 of user(s) or user group(s) in which to receive the information. The user(s) or user group(s) defined in the NM 190 can be attached to single or multiple case groups (configured by the CM 185). In an embodiment, the NM 190 allows the user to determine which user(s) or user group(s) receive the at least one notification component(s) 170 and transmitted data point(s) 175 based on time intervals, such as day, week, month and year.

The NM 190 also provides the user the ability to send a variety of notification components 170. In an embodiment, the notification component 170 can be transmitted from the comparison module 140, which in an embodiment can include a notification server, based on different preferences or methods of delivery, e.g. SMS, MMS, Email, Instant Messaging, Voicemail, and the like. Furthermore, the NM 190 also allows the user to select several different types of content within the at least one database 150 in which to be transmitted with the notification component 170.

In an embodiment, the user is also able to control the threshold in which the first and second content, 110 and 155, respectively, are compared. However, this function can also be implemented within the AMM 210. In an embodiment, the user is able to send a non-threshold comparison to an operator or automated operator module e.g. administrative authority, to determine substantial similarity, as a primary or secondary measure in validating the comparison. This function can be utilized in cases where an "unconfirmed" or non-threshold comparison or comparisons result.

Numerous scenarios can be detailed in which specific information is transmitted to appropriate users at pre-selected times and methods, who are selected to handle that type of information, or have requested specific information to be transmitted, based on a variety of factors specific to those individuals, as such, examples above are not designed to be limiting in any way.

The DBRM 195 is a module configured to provide the user the ability to develop reports and search the at least one database 150 within the managed biometric-based notification system 100. The at least one database 150 is searchable by any case information filed within the system 100 through the fields created in the CM 185. The information can include records, notes, observations, details, and other information which can apprise the user(s) as to the status or propensities of an individual in an environment. The user is able to access and view cases, generate reports, which include, but are not limited to, match, enrollment and notification logs, as well as other internal statistics. The DBRM 195 also provides the ability to export these logs and reports in any general format.

The SCM 200 is a module configured to provide the user the ability to subscribe, manage, and browse current and available database subscriptions. This module increases the referenced content, or second content 155, within the managed biometric-based notification system 100. The system 100 also centralizes available databases and provides subscription information to the user, such as a description of the available database(s), associated pricing for each database, and a reference to the overall content. The SCM 200 also provides the user the ability to share databases, or form "Alliances," with other subscribers within the system 100. However, this functionality, in an embodiment, can be included in the CM 185. The functionality of this module also provides for the ability to request the authority who implements the system 100, to data mine other databases. The process of data mining, includes the ability to process data from other third party databases, and will create a database or databases based on processed or extracted feature sets from facial images and other information found within those databases.

The SM 205 is a module configured to provide customer interaction and support to the user of the content management module 180 with the managed biometric-based notification system 100 administrator, or authority, who implements the system 100. The SM 205 provides an interactive program configured to aid the user in resolving issues with the system 100. The issues presented within the SM 205 can also be tracked and managed. The SM 205 includes a frequently asked questions application providing answers to commonly filed questions, and also includes other methods of support including live help and chat programs.

The AMM 210 is a module configured to provide the administrator or authority who implements the managed biometric-based notification system 100, an interface to manage user accounts, access, and data within the system 100. Through the AMM 210, is the ability to set up preferences, as well as rights to and within the system 100, including adding, deleting, modifying access for other users and sub-users of the CM 185. The AMM 210 is also configured to add, edit, and remove the at least one image acquiring system 105, the at least one pre-selected receiving node 220, as well as other components associated with the system 100. This feature is particularly important where more components are added due to an increase in employees and/or areas in which to implement at least one image capturing device 105.

In an embodiment, the AMM 210 can be implemented with the comparison module 140 by a single authority, having control over multiple implemented managed biometric based notification systems 100. In this embodiment, remaining modules of the content management system 180 can be implemented into an environment or be provided to the user through a web portal. In this embodiment, the users of the system 100 are able to interact with the comparison module 140 through the modules described herein. This functionality allows for control of implemented systems 100 within plural environments and interaction between one or plural ones of those environments.

Figure 6:
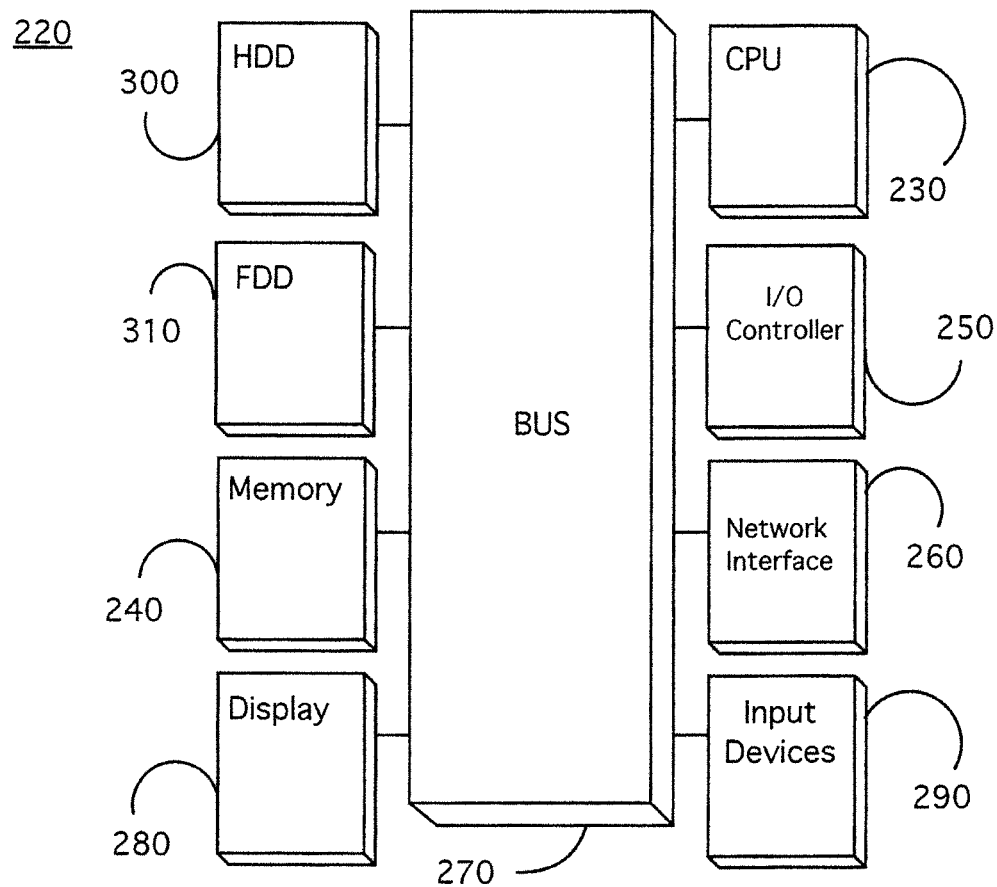
FIG. 6 is a block diagram of at least one pre-selected receiving node.

FIG. 6 illustrates the at least one pre-selected receiving node 220. In an embodiment, the node is a terminal, which can be a plurality, with a motherboard on a computer network, including a central processor 230, associated memory 240 (e.g., DRAM, ROM, EPROM, EEPROM, SRAM, SDRAM, and Flash RAM) for storing programs and or data, an input/output controller 250, optional special purpose logic devices (e.g., ASICs) or configurable logic devices (e.g., GAL and reprogrammable FPGA, a network interface 260, a display device 280, one or more input devices 290, a hard disk drive 300, a floppy disk drive 310, and a data bus 270 (e.g., a SCSI bus, an Enhanced IDE bus, or a Ultra DMA bus) coupling these components, allowing communication therein.

The central processor 230 can be any type of microprocessor. The display device 280 can be any type of display, such as a liquid crystal display (LCD), cathode ray tube display (CRT), or light emitting diode (LED), capable of displaying the generated outputs. The input device 290 can be any type-of device capable of providing the inputs described herein, such as keyboards, numeric keypads, touch screens, pointing devices, switches, styluses, and light pens.

The network interface 260 can be any type of a device, card, adapter, or connector that provides the at least one pre-selected receiving node 220 with network access to a computer or other networked enabled device. In one embodiment, the network interface 260 enables the at least one pre-selected receiving node 220 to connect to a computer network such as the Internet. The content management module 180, in an embodiment, is loaded into the pre-selected receiving node 220 via the hard disk drive 300, the floppy disk drive 310, or the network interface 260, wherein in another embodiment, is included within the comparison module 140. Alternatively, the program can reside in a permanent memory portion (e.g., a read-only-memory (ROM)) chip) of the main memory 240.

The at least one pre-selected receiving node 220 can be implemented on at least one of client and server. A "client" can be broadly construed to mean one who requests or receives a file, and "server" can be broadly construed to be the entity that sends or forwards the file. In an embodiment, the at least one pre-selected receiving node 220 operates in a networked environment using a communication connection to connect to one or more remote computers. The remote computer can include a personal computer, server, router, network PC, a peer device, or other common network node. The communication connection can include a Local Area Network (LAN), a Wide Area Network (WAN), or other networks.

Figure 7:
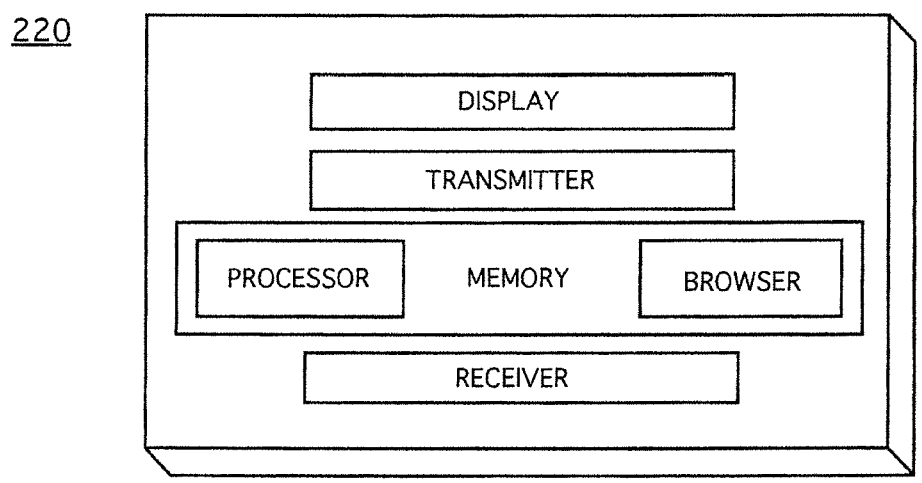
FIG. 7 is a block diagram of an embodiment of the at least one pre-selected receiving node.

FIG. 7 illustrates an embodiment of the at least one pre-selected receiving node 220. In an embodiment, the at least one pre-selected receiving node 220 is a transceiver or other similar means for receiving the at least one notification component 170. The receiving means can include, but is not limited to, a cell phone, a personal digital assistant (PDA) or other similar handheld portable device. Further, in this embodiment the at least one pre-selected receiving node 220 can function as at least one image acquiring system 105, allowing the user means to capture the first content 110 and receive the notification component 170 and the at least one transmitted data point 175. The use of the transceiver supplies mobility and versatility to the user in the environment. The transceiver can be networked to other devices, such as in a client-server or peer to peer system, allowing the user to receive and send information to another transceiver in the environment.

In use, upon implementation of the managed biometric-based notification system 100 into an environment, the first content 110 is captured by the at least one image acquiring system 105. In an embodiment, the first content 110 is an image of a person, wherein the image substantially includes the facial region. In another embodiment, the first content 110 is an electronic translation of handwritten or printed images into machine text or optical character recognition (OCR), wherein the use of machine vision cameras or digital video cameras and computers is used to read and analyze alphanumeric characters. However, the first content 110 can generally be any type of information important to the environment, and while only certain types of information is recognized by the comparison module 140, the remainder of the information can be categorized, stored, and retrieved upon request by the user in the same manner as compared content.

Figure 8:
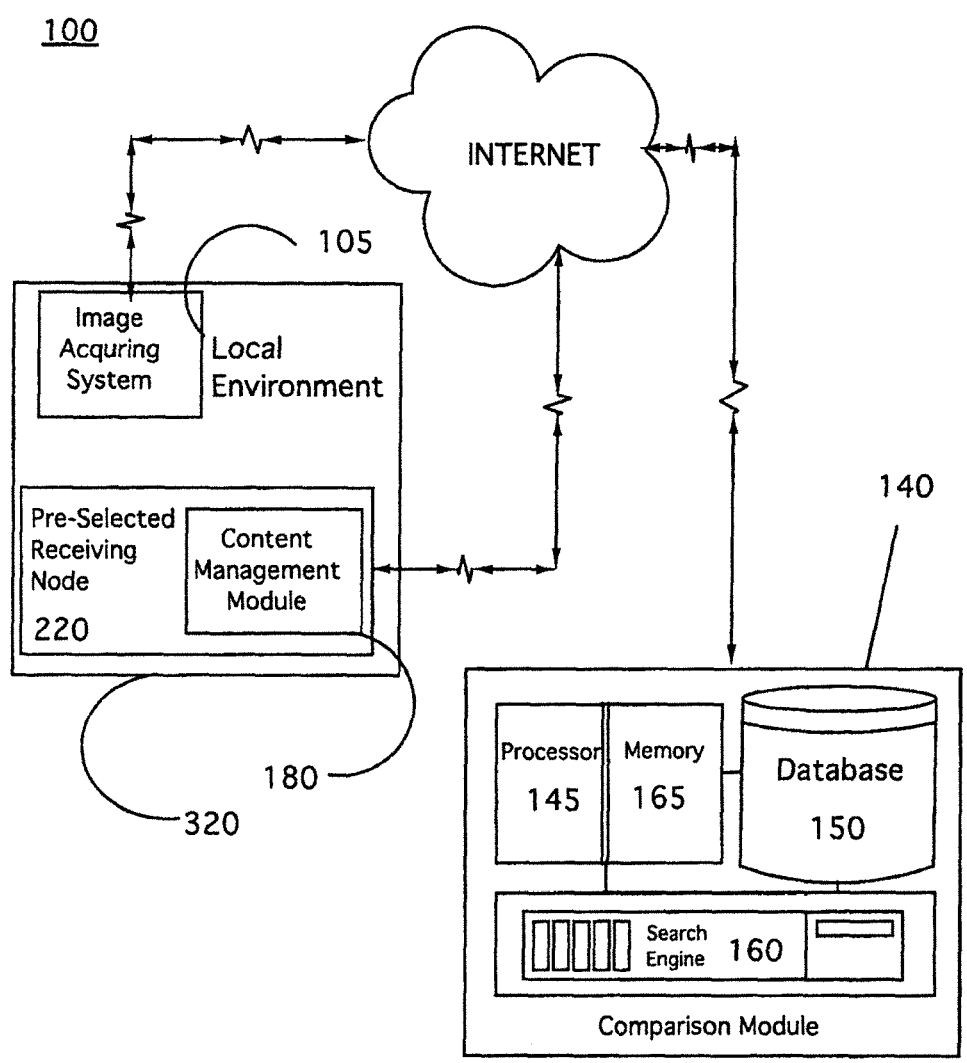
FIG. 8 is a block diagram of an embodiment of the managed biometric-based notification system.
Figure 9:
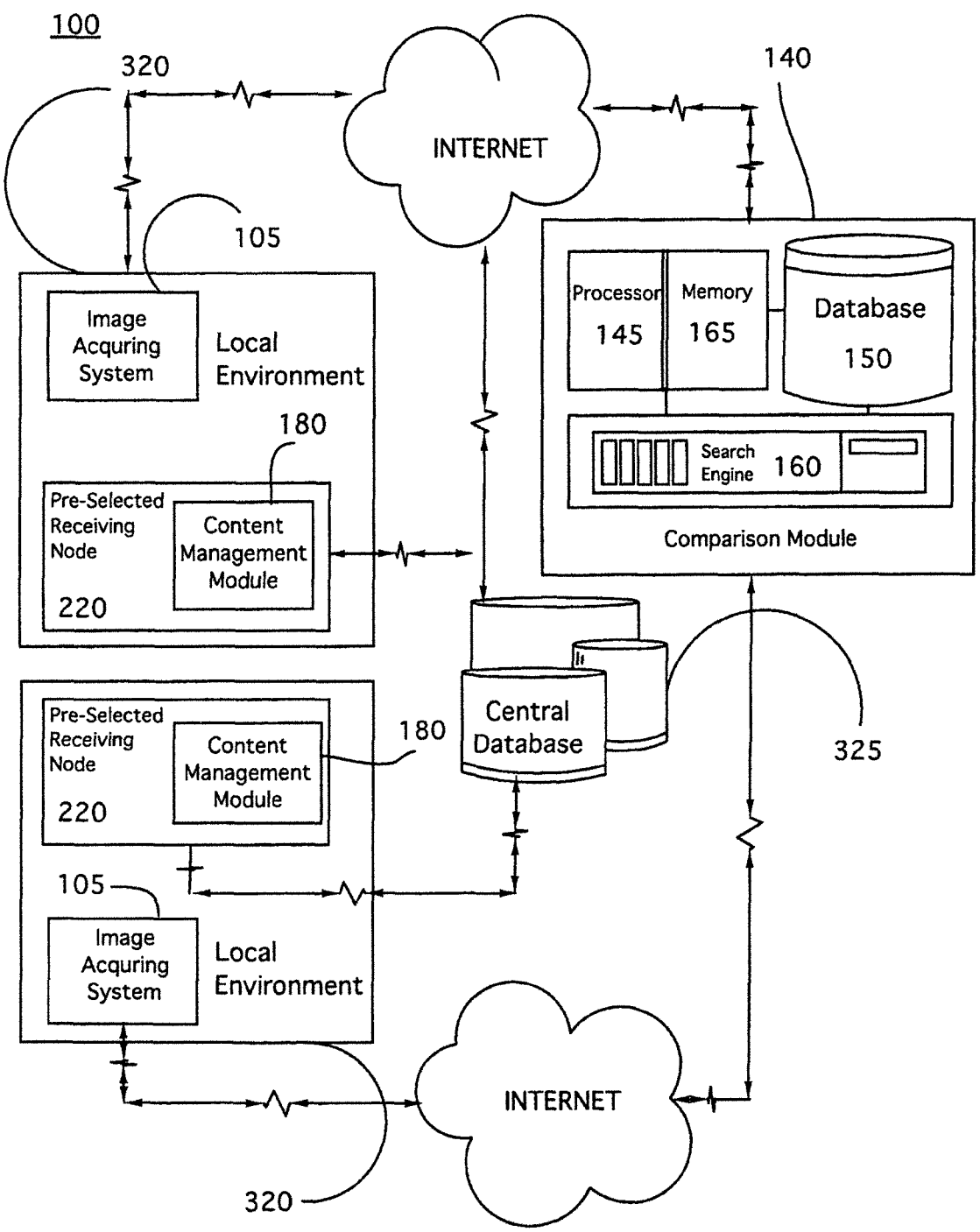
FIG. 9 is a block diagram of an embodiment of the managed biometric-based notification system.

FIG. 8 illustrates, in one embodiment, the at least one image acquiring system 105 disposed in a commercial environment 320. In this embodiment, commercial establishments are able to implement the managed biometric-based notification system 100 to reduce the amount of "shrinkage" or other crimes occurring in the commercial environment 320. Illustrated in FIG. 9, in another embodiment, stores within the same community or stores within the same chain, who are subscribers to the system 100, are able to share at least one central database 325. The illustrated configuration will allow the sharing of information, via configuring the content management module 180, pertinent to a certain store or stores, placing other "Alliances" on notice of a specific activity or person specific to the chain of stores or community.

In an embodiment, the at least one image acquiring system 105 includes a machine vision camera. Machine cameras incorporate frames rates of either 15 fps (SXGA) or 34 fps (VGA), and include camera features such as a standard processor, operating system, SD RAM and I/O connectivity via Ethernet, USB serial port and monitor out. Components of a machine vision system will comprise several of the following: at least one digital or analog camera with optics for acquiring images. An interface for digitizing images (widely known, in the case of CCTV cameras, as a "frame grabber"). A processor (often a PC or embedded processor, such as a DSP) (in some cases, all of the above are combined within a single device, called a smart camera). Input/Output hardware (e.g. digital I/O) or communication links (e.g. network connection) to report results. Lenses to focus the desired field of view onto the image sensor. A program to process images and detect relevant features. In an embodiment, the machine vision camera includes a synchronizing sensor for detection (often an optical or magnetic sensor) to trigger image acquisition and processing. It can be understood by those skilled in the art that many available digital video and digital cameras can be used in conjunction with the managed biometric-based notification system 100 as a means for acquiring images, as such, the examples are not limiting in any way.

Figure 10:
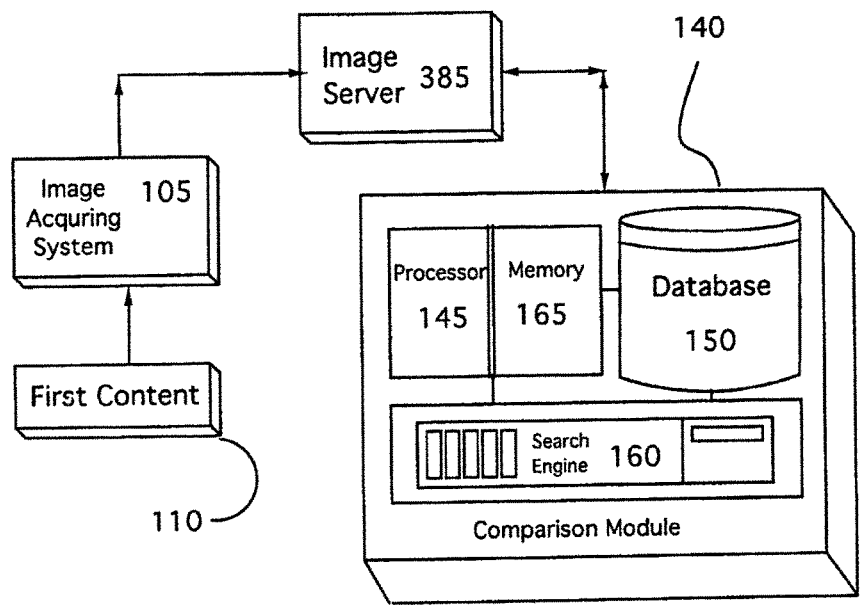
FIG. 10 is a block diagram of the managed biometric-based notification system including an image server.
Figure 11:
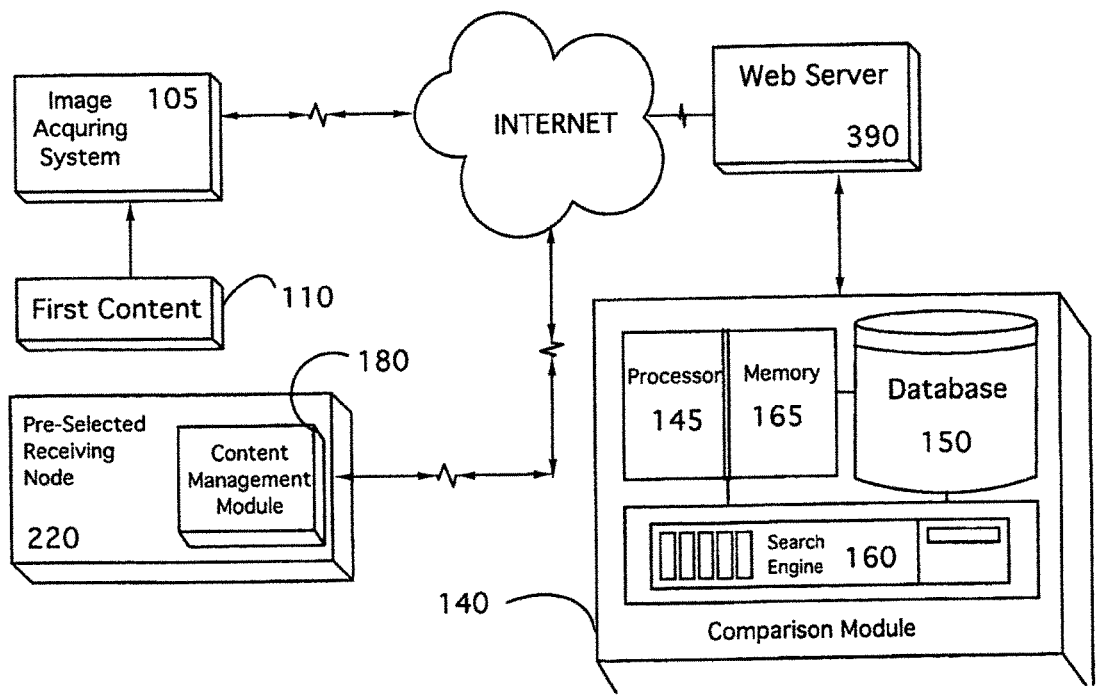
FIG. 11 is a block diagram of the managed biometric-based notification system including a web server.

In this embodiment, as illustrated in FIG. 10, the at least one image acquiring system 105, due to the large amounts of collected data, which can be uncompressed video, includes at least one server 385 on site to handle the large quantities of data collection. In this embodiment, the at least one image acquiring system 105 transmits the first content 110 to an image server 385, wherein the image server 385 would store the first content 110 and transmit to the comparison module 140 after comparison of the first and second content, 110 and 155, respectively, yields threshold level similarity (process illustrated in FIG. 14). In another embodiment, as illustrated in FIG. 11, the at least one image acquiring system 105 transmits the first content 110 to a web server 390 of the comparison module 140. This configuration allows elements of the system 100 to be in various locations connected to a network.

After capturing the first content 110 from an environment, or otherwise called a "tracking environment," the first content 110 is then transmitted to the comparison module 140. This step is generally called "Image Acquisition." Image Acquisition refers to how a computer gets image data from a camera into the computer. In an embodiment, the at least one image acquiring system 105 transmits uncompressed video to the comparison module 140. In another embodiment, the at least one image acquiring system 105 is on a network.

Figure 12:
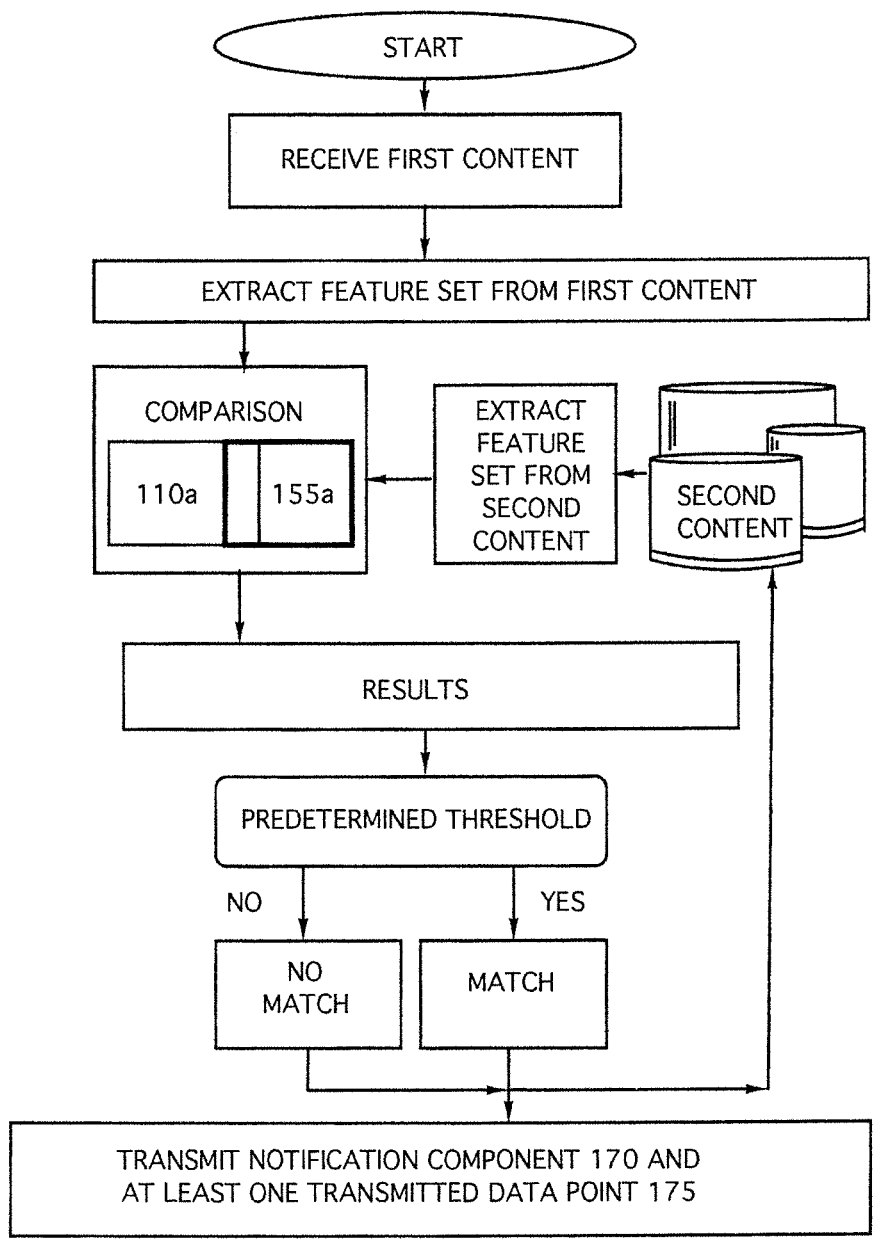
FIG. 12 is a flow chart of a process of the comparison module.

FIG. 12 illustrates the process of the comparison module 140. The comparison module 140 is configured to generate a set of descriptors or the feature set 110a from the received first content 110. The comparison module 140 includes the at least one search engine 160, operatively coupled with the at least one image acquiring system 105 and the at least one database 150. The at least one search engine 160 is programmed to execute a series of instructions, stored on the memory 165, to process a feature set 110a of the first content 110 and a substantially similar feature set 155a of the second content 155.

If the feature sets 110a and 155a meet a predetermined threshold, the comparison module 140 determines the comparison to be a match. The notification component 170 is then transmitted, and in an embodiment can include the notification server operatively coupled to the comparison module 140. In another embodiment, the notification component 170 can also be transmitted if a comparison does not result in a match. As stated previously, the operator can be employed at this juncture to determining substantial similarity. However, regardless of whether a match occurs, the content is stored within the at least one database 150. The notification component 170 can be comprised of any variety of notification made available by the NM 190, delivered at any preference presented by the same module. Furthermore, the at least one transmitted data point 175 is also transmitted along with the notification component 170, and its form and timing are determined by the same.

Figure 13:
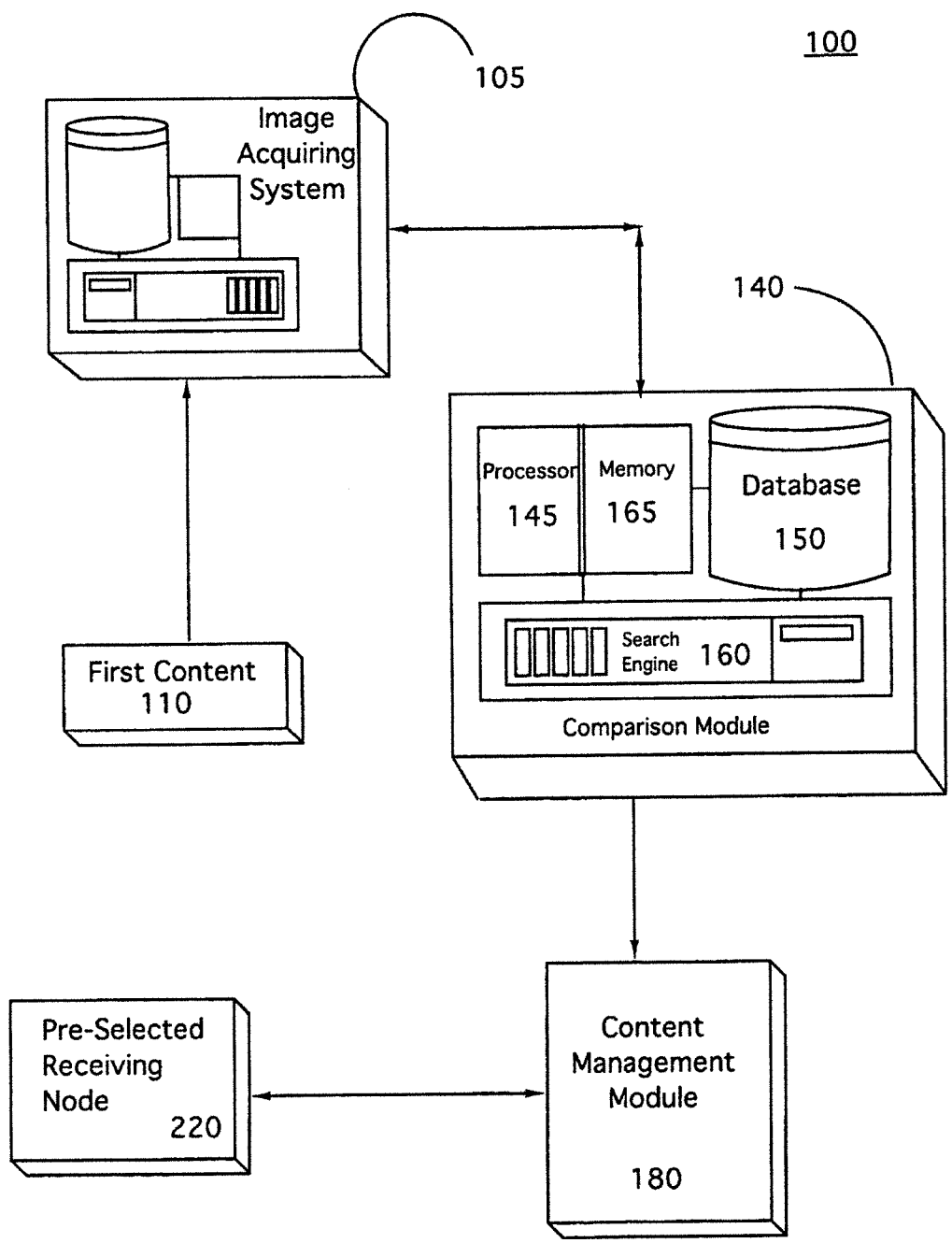
FIG. 13 is a block diagram of an embodiment of the managed biometric-based notification system.
Figure 14:
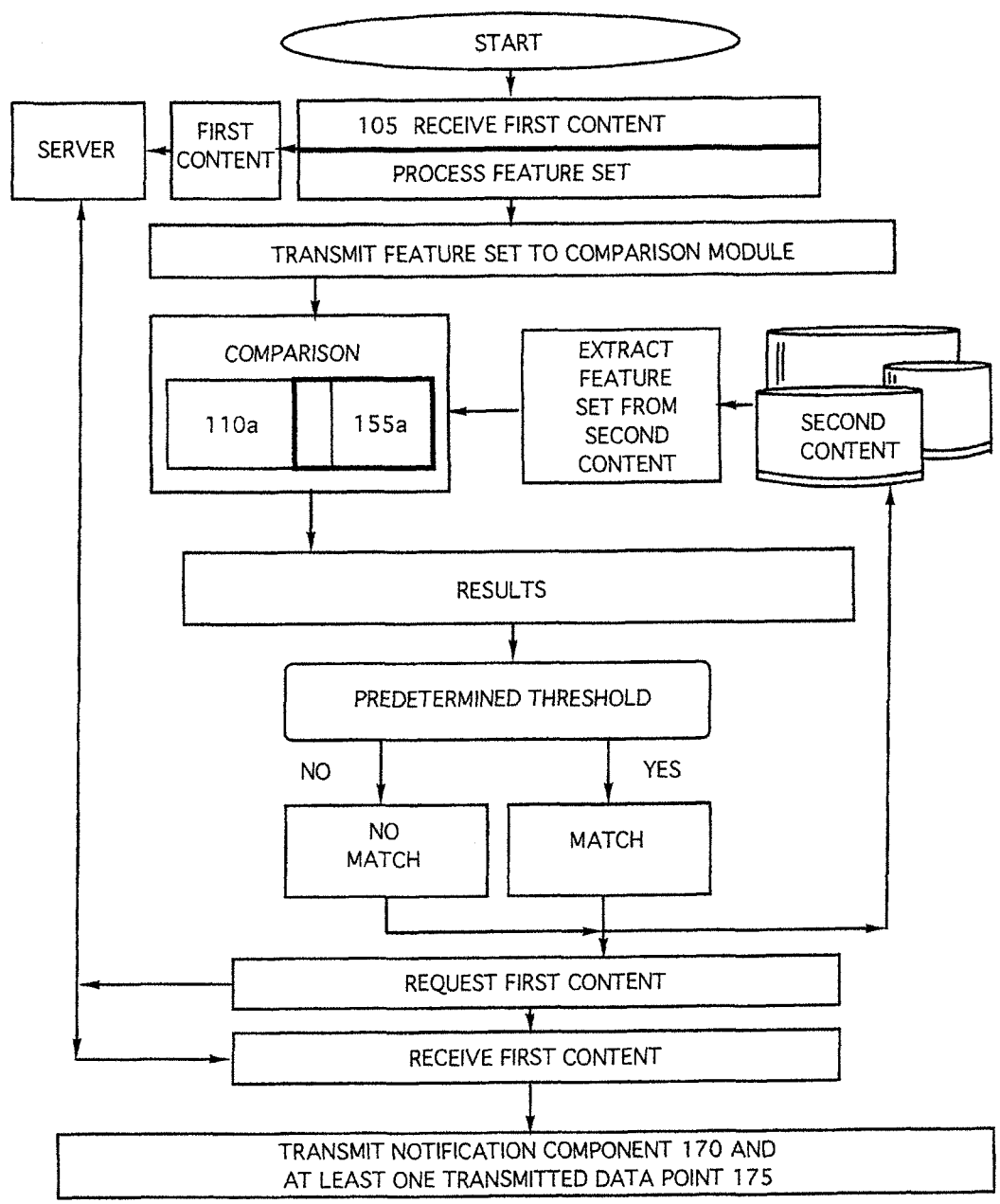
FIG. 14 is a flow chart of a process of the at least one image acquiring system and comparison module.

Illustrated in FIG. 13, and in connection with FIGS. 10 and 11, is an embodiment of the managed biometric-based notification system 100. In this embodiment, the comparison module 140 receives the feature set 110a of the first content 110. However, the first content 110 remains stored on the image server 385 or web server 390, as illustrated in FIGS. 10 and 11. In an embodiment, an extraction process is implemented within the local environment 320 at the at least one image acquiring system 105. In this embodiment, as illustrated in FIG. 14, the processor 125 of the at least one image acquiring system is programmed to execute a series of instructions, stored on the memory 135, to process the feature set 110a of the first content 110. Here, an algorithm or extraction module found in the comparison module 140 is implemented at the at least one image acquiring system 105. The comparison module 140 is then configured to compare the feature set 110a with the processed feature set 155a of the second content 155, also illustrated in FIG. 10. If the statistical threshold or substantial similarity is satisfied the first content 110 is transmitted to the comparison module 140 upon request.

In an embodiment, the comparison module 140 includes a facial recognition algorithm designed to process the feature set 110a of the first content 110 and a feature set 155a of the second content 155. In another embodiment, a process algorithm, or modules therein, are implemented within the commercial environment at the at least one image acquiring system 105 and processes the feature set 110a, and comprise the comparison module 140. The series of instructions used by the comparison module 140 can include the "FACE-IT" facial recognition system from Identix® Inc. (Merged with L-1 Identity Solutions Company) or "FaceVACS"® from Cognitec Systems. Generally, the widely available technology can identify individuals independent of variances in human faces, including mimicry and aging variances, as well as variances coming from a new hair style, glasses, or lighting changes.

The algorithms involved in comparing content are implemented to determine the statistical closeness of the data involved, as such, multiple algorithms can be implemented for the determination of facial identification, as well as algorithms identifying other features of an individual in the environment, e.g. textual, to further limit the statistical closeness of an individual. It can be understood by those skilled in the art that many available algorithms can be used in conjunction with the managed biometric based notification system 100 for comparison of content, as such, the examples are not limiting in any way.

Figure 15:
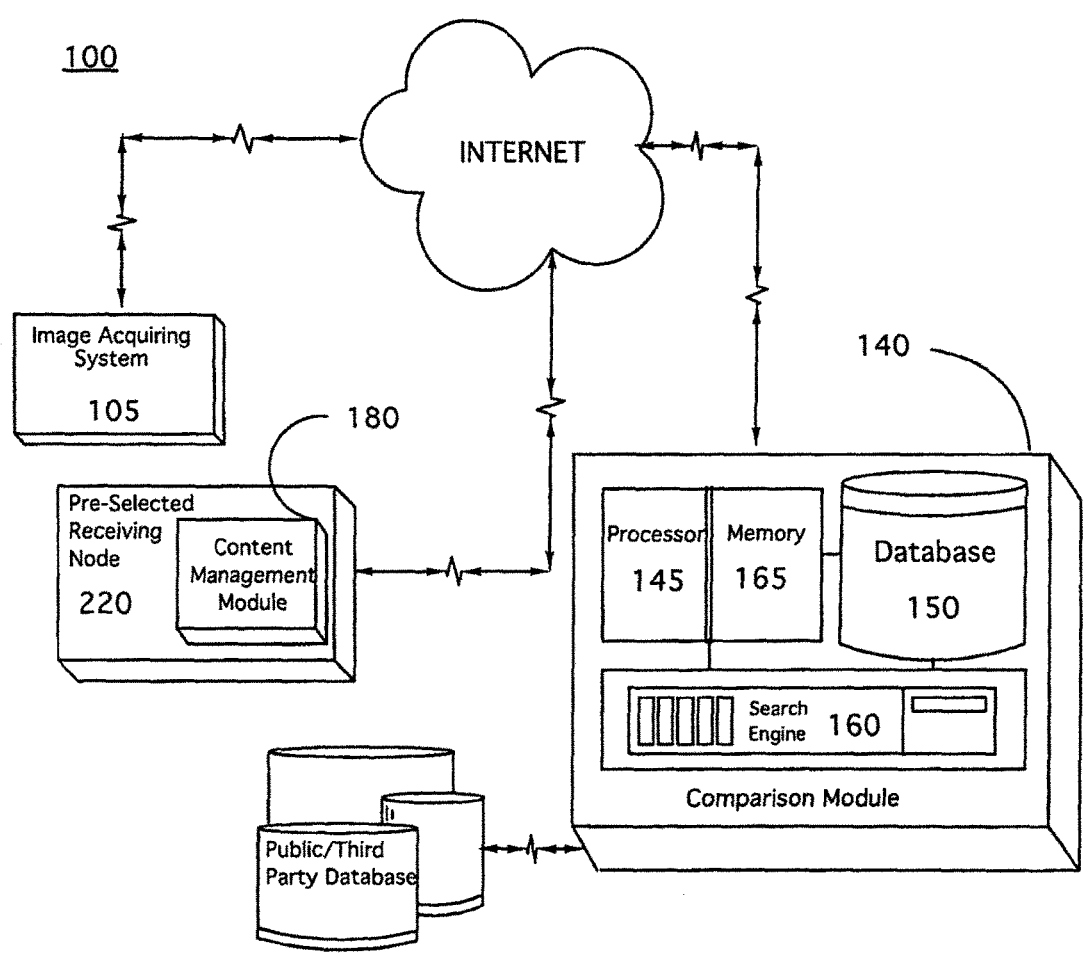
FIG. 15 is a block diagram an embodiment of the managed biometric-based notification system providing access to a third-party database.

As indicated above, in comparing the first and second content, 110 and 155, respectively, the comparison module 140 draws from the at least one database 150. However, the comparison module 140 in conjunction with the content management module 180 provides access to a variety of different content forms, databases and servers. As FIG. 15 illustrates, in an embodiment, the database content can be predetermined, in that, it is the result of subscriptions to public or third party databases, e.g. government, law enforcement agencies, state databases, or databases the user requests to data mine. In another embodiment, as indicated above, the second content 155 is predetermined by the local environment 320, which can be based off internal company records and documents. As such, database content can be built from generated content within the system 100 through user input and feedback. The second content 155 can also be generated from outside the system 100 environment.

Figure 16:
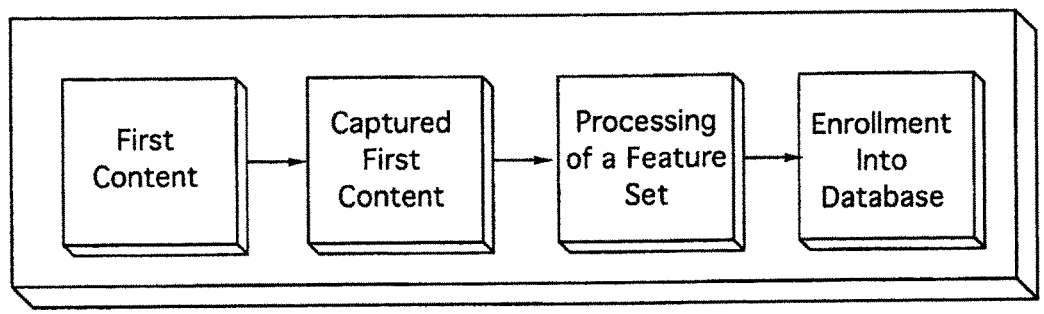
FIG. 16 is a block diagram of a process of enrollment.
Figure 17:
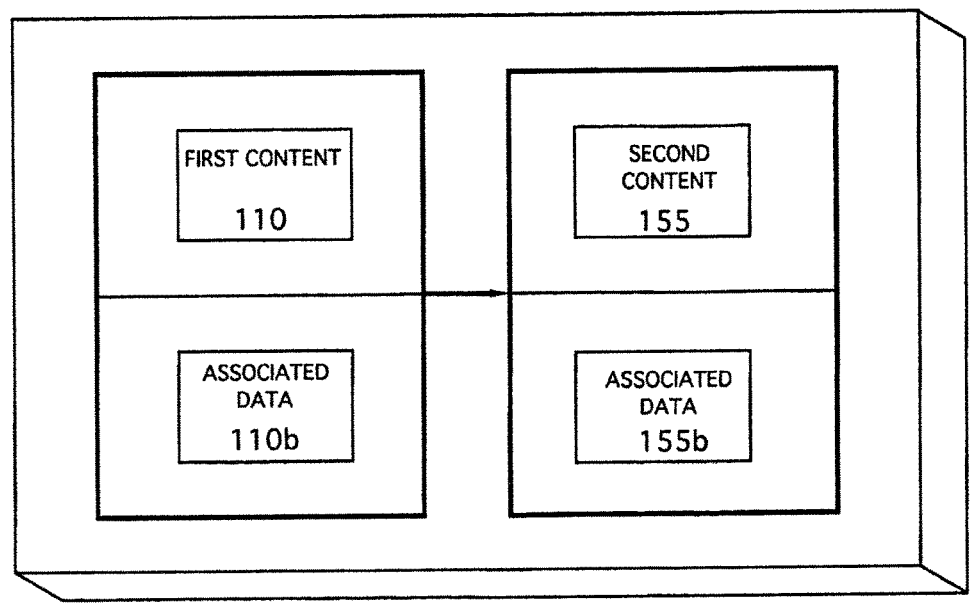
FIG. 17 is a block diagram of including an associated data to the process of enrollment.

Illustrated in FIG. 16 is the enrollment process through the CM 185. In this embodiment, the user is able to enroll an individual into the managed biometric-based notification system 100. The system 100 comprehends the creation or enrollment when the feature set 110a is processed and stored in the at least one database 155. As illustrated in FIG. 17, the CM 185 provides the ability to the user, to upload associated data 110a with the first content 110, e.g. notes on interactions and/or observations related to the first content 110, as provided by the utility in FIG. 6.

After the first content 110 and associated data 110b are within the at least one database 150, it becomes second content 155 and associated data 155b. In an embodiment, the comparison module 140 includes databases dedicated to the associated data 155b, and in another embodiment, includes databases dedicated to each type of associated data 155b described herein. The second content 155 can then be manipulated via the content management module 180 by the user. The managed biometric-based notification system 100 generally provides for the identification of an individual already retained in the system 100 and image retention for those individuals who are not within the system 100 but are to be identified at a future date.

The degree in which the first and second content, 110 and 155, respectively, must match is deemed "substantial similarity." This level of similarity is a threshold or a predefined set of parameters set forth by the user of the managed biometric-based notification system 100. These parameters may be modified by users, and in an embodiment, users who have been given authority within the system 100, such as that defined by AMM 210. The comparison module 140 determines the substantial similarity of the feature sets of 110*a* and 155*a*, and the notification component 170 and at least one transmitted data point 175 are transmitted as determined by the content management module 180 if that similarity threshold is met.

In an embodiment, if the comparison module 140 transmits a plurality of second content 155 corresponding to varying degrees of similarity among compared feature sets or where the feature sets of 110*a* and 155*a* do not meet the predetermined threshold of the system 100, the operator determines substantial similarity. And as mentioned above, the operator can also be implemented as a primary or secondary measure in determining substantial similarity.

After a comparison meets the predetermined threshold, the comparison module 140 transmits the notification component 170 based on pre-selected criteria inputted into the content management module 180 via the NM 190 by the user. The notification component 170 can be comprised of many different forms as set forth in the NM 190. The notification component 170 can be wirelessly communicated including but not limited to utilizing short messaging service (SMS), multimedia messaging service (MMS), email, instant messaging or an Email to SMS, SMS to Email, MMS to Email, or Computer to SMS applications.

The at least one transmitted data point 175 is information transmitted along with the notification component 170, and is comprised of information which, in an embodiment, includes an image, e.g. the comparison image of the comparison module 140 or any form of the second content 155 described herein. In another embodiment, the at least one transmitted data point 175 includes the associated data 155*b*, or the associated data 155*b* along with the recently compared second content 155. However, content can also be transmitted that describes the individual's record or other persons that individual is known to associate with, known accomplices, any other form mentioned herein.

Furthermore, in the criminal context, where a comparison of first and second content, 110 and 155, respectively, yields a substantially similar threshold, the at least one notification component 170 is sent out detailing the identification of that criminal, and can include associated data 155*b*, e.g. prior criminal history, bench warrant, state prison, jail, conviction(s), arrest(s), charge(s), involved agencies, previous stolen items, treatment of staff, and gang affiliation. In an embodiment, the at least one transmitted data point 175 can include audio and/or textual information, e.g. instructions, guides, and/or user manuals specific to a product in the environment, which can be recorded through the CM 185. However, the specifics of the at least one transmitted data point 175 is dependent to large degree on the content which is compared within the system 100. As such, general information about actions or events local to the commercial environment, or other individuals can also be transmitted. This feature can aid in providing customized service based on previous buying habits, amounts, and frequently asked questions.

The notification component 170 serves more than one function in the managed biometric-based notification system 100. In another embodiment, the notification component 170 can activate or initiate an event. The comparison module 140 transmits the notification component 170 as an instruction signal to an actuator 330 which functions to perform an event, e.g. motor, or activate in application another networked device. In activating a motorized event, a servomechanism can be connected which supplies and transmits a measured amount of energy for the operation of another mechanism or system. In an embodiment, functional interfaces can interact with an SMS gateway to perform functions in the environment. However, the notification component 170 can take a variety of forms in activating events, as and as such, the form is not limited by the provided examples.

Figure 18:
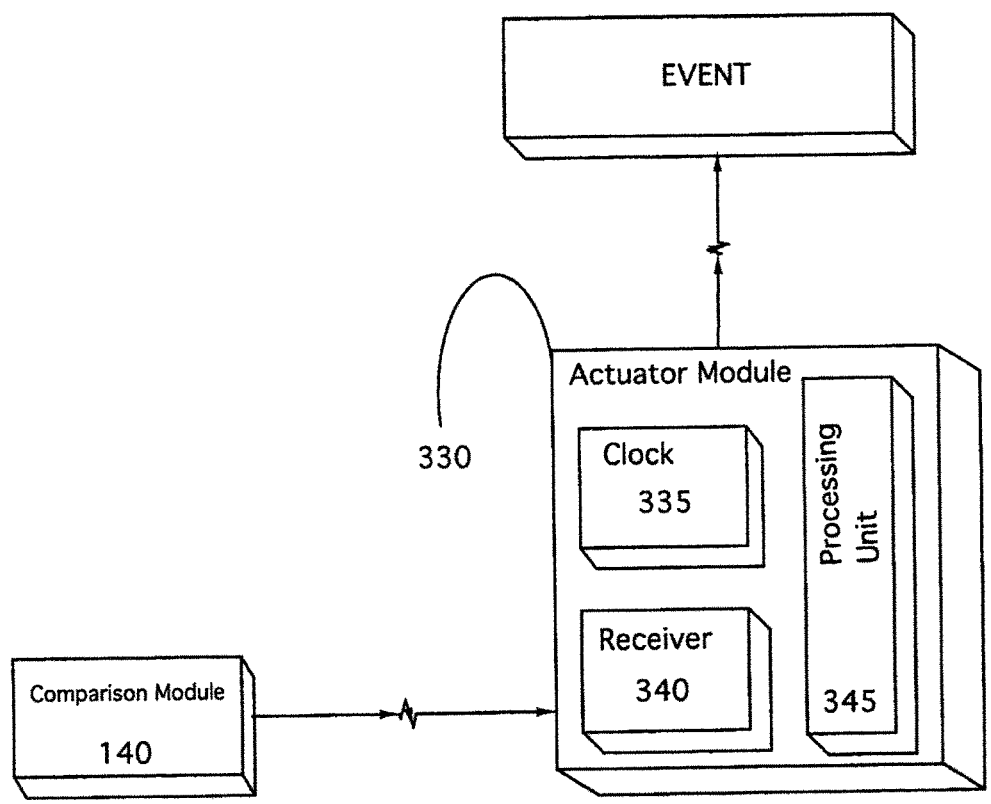
FIG. 18 is a block diagram of the content management module activating an event.

FIG. 18 illustrates an embodiment, where a transducer or an actuator module 330 is included, which typically includes a clock 335, a processing unit 345, and a receiver 340, and is able to receive an input signal from the content management module 180 via the NM 190. The actuator module 330 supplies as an output, a command via dry contact to control a motor and the circuitry of a door e.g. gate controller or lock via door strike or other similar device, in activating an event. In this embodiment, control over the environment can occur via a controller which can send an output command to a plurality of devices within a network. In another embodiment, a switch can be used to either turn on or off a device. In this embodiment, a binary command can be sent over a network to an interface, or remotely connect, to receivers controlling other devices and/or software in the environment.

Generally, the purpose of the at least one notification component 170 is to activate an event and/or notify the user of an individual. However, it can be understood by those skilled in the art that the notification of an individual or activation of an event can take a variety of forms and activate a variety and plurality of users and devices, depending on the context, as such, the examples are not limiting in any way.

In an embodiment, wherein the at least one notification component 170 is then sent to a pre-selected receiving node 220, the receipt of the at least one notification component 170 can occur on a stationary terminal and/or transceiver or other mobile device. In an embodiment, the pre-selected receiving node 220 is a plurality of transceivers. The plurality of transceivers can transmit to other transceivers and/or retransmit information to other transceivers within the environment. In this embodiment, employees within a commercial environment 320 are able to communicate and also send image data and enroll content in the content management module 180. In another embodiment, the transceiver can also serve as a "local" remote control, operating by sending a wireless (e.g. infra-red or radio frequency) signal to a transceiver which is connected to a motor or application via another pre-selected receiving node 220 and a receiver. This embodiment provides the user of the system 100 another level of control in the environment.

The managed biometric-based notification system 100 provides the ability to control and manage information gathered in a real-time environment, and can interact with that environment with up to date information from a variety of external sources. The system 100 provides the user with an interactive system component which includes the ability to transmit information to available resources using a variety of technologies and provide real-time feedback in a dynamic environment.

An advantage of the managed biometric-based notification system 100 is the content management module 180 element of the system 100. The content management module 180 controls the distribution of content into an environment in which identification of information is crucial. The content management module 180 allows the user to interact with the reminder of the system 100 through, in an embodiment, a browser-based interface. The user is also provided control over received, stored, and compared content within the system 100.

Specifically, an advantage of the managed biometric-based notification system 100 is the ability to manage the transmission of the at least one notification component 170. The content management module 180 allows the user the ability to manage events in the environment, such as the activation of applications or actuators linked to other devices, and also users and user groups in receiving information. This advantage intersects the resources in the environment with the result of the implemented algorithm in a real-time scenario.

The system 100 also provides the user with the ability to manage the type of notification, e.g. the mode of transmission. The time of transmission is can also managed. Here, the notification component 170 can be directed based a variety of predetermined factors e.g. time and date intervals. While the transmission of at least one notification component 170 containing at least one data point 175 of an individual who is known for shoplifting can be transmitted to the available security guards, there are many more uses directed to the system 100, such as, the purchase history of an individual transmitted to a sales associate or a person who is known to have a heart condition to someone on staff who understands Cardio Pulmonary Resuscitation.

The application also can be used in allowing specialized or certain persons into a variety of areas in the environment. As such, it can be understood by those skilled in the art that many situations are possible in an environment requiring information specific for that situation, which can be used in conjunction with the managed biometric-based notification system 100, therefore the above examples are not designed to be limiting in anyway.

Another advantage supplied by the content management module 180 is the ability to allow the user the option of creating a variety of databases and content within the managed biometric-based notification system 100. The content management module 180 includes the ability to create databases by subscription, data mining or create content from the local environment 320. This option allows the user of the system 100 control over the organization of the content.

The creation of content within the managed biometric-based notification system 100 can also include a variety additional data referencing created content. As such, an additional advantage of the system 100 is the ability to include associated data e.g. including images, notes, within the system 100. The associated data can be uploaded by a variety of methods identical or equivalent to the at least one notification component 170. Furthermore, another advantage of the system 100 is the ability to modify the stored content. Towards this end, the content management module 180 provides security measures via the AMM 210, for those who modify content within the system 100. Updated information about an individual is important where an individual has had certain hostile interactions with staff, maybe increasing in hostility, or is known to carry a weapon, or has previously targeted a specific area of the store. Thus, if given authority, modification of content is crucial to maintaining an updated system 100.

Another advantage of the managed biometric-based notification system 100 is the at least one pre-selected receiving node 220. In an embodiment, the at least one preselected receiving node is a transceiver. The transceiver provides the user the ability, not only to communicate crucial information to the next user or staff member in the environment, and provide mobility, but also activate applications or events based on that information. This places an added level of control to those within the environment. Moreover, while the transceiver is able to communicate to another transceiver in the environment, the transceiver is also able to communicate an image to the comparison module 140 and receive the at least one notification component 170 based on the content transmitted.

The managed biometric-based notification system 100 can be used in a variety of environments. The system 100 can be implemented in the commercial environment 320, in perimeter surveillance, automated entry, customer recognition or preauthorized visitor identification. In a retail environment, the system 100 will reduce operational costs and increase the efficiency of the staff.

After being placed in strategic locations, the managed biometric-based notification system 100 will also reduce shrinkage. The system 100 accomplishes this result by increasing the probability in matching an individual with a comprehensive image in a database. The system 100 is constantly being updated and connected with content, coming from a variety of sources, e.g. the environment in which it is placed, third party databases, watch-lists, requested data mined sites. As such, retrieved information is being compared against current data from a variety of sources, increasing the probability of a match.

The managed biometric-based notification system 100 is designed to be employed in a plurality of locations and including a central station or headquarters. As such, first content 110 acquired from the plurality of locations networked to the system 100 generally would be transmitted to the central station wherein the comparison module 140 would start the process illustrated in FIG. 10, however, an advantage of the system 100 is the implementation of the process within the at least one image acquiring system 105 as illustrated in FIGS. 13 and 14.

The advantage of processing the feature set 110a at the at least one image acquiring system 105 is that it allows for only the feature set 110a to be transmitted for comparison. If the comparison achieves the desired threshold of the system 100, the comparison module 140 requests the first content 100 from the at least one image acquiring system 105. This is particularly important where a large number of users of the system 100 are networked. This advantage reduces the amount of data transmitted over a network, and thus reduces the amount of strain on the available bandwidth.

While certain exemplary embodiments have been described and shown in the accompanying drawings, it is to be understood that such embodiments are merely illustrative and not restrictive of the current invention, and that this invention is not restricted to the specific constructions and arrangements shown and described since modification can occur to those ordinarily skilled in the art.

What is claimed is:

1. A managed biometric-based notification system for recognizing a person and for selectively notifying one or more users of the system, the system comprising:

an image acquiring system for capturing from a live human being a first content comprising a feature set;

a special purpose computer including a database, a case module, a subscription content module, a search engine, a comparison module, and a notification module;

the database including second content that includes a feature set associated with a personal identifier;

plural receiving nodes, each receiving node associated with at least one personal identifier that is unique among the receiving nodes;

the case module for updating the second content stored in the database with the first content acquired by the image acquiring system;

the subscription content module for updating the second content stored in the database by utilizing data from a third party when a third party subscription allows the comparison module to compare the feature set of the first content and a feature set of the third party data;

upon acquisition of the content, the search engine for searching the database for second content feature sets corresponding at least in part to the first feature set;

upon finding one or more corresponding second content feature sets, the comparison module for determining the degree of similarity of each corresponding feature set and selecting at least one corresponding feature set as a best match; and, the notification module for determining a notification component including the personal identifier of the best match and selecting the receiving node associated with the personal identifier of the best match;

wherein the notification module is configured to transmit the notification component to the selected receiving node when the best match meets a pre-selected similarity threshold.

2. A managed biometric-based notification system ("MBNS") for recognizing a person and for selectively notifying one or more users of the system, the system comprising:

an image acquiring system for capturing from a live human being a first content comprising a feature set;

a special purpose computer including a database, a case module, a subscription content module, a search engine, a comparison module, and a notification module;

the database including second content that includes a feature set associated with a personal identifier;

plural receiving nodes in plural locations;

the case module for updating the second content stored in the database with the first content acquired by the image acquiring system;

the subscription content module for updating the second content stored in the database by utilizing data from a third party;

upon acquisition of the content, the search engine for searching the database for second content feature sets corresponding at least in part to the first feature set;

upon finding one or more corresponding second content feature sets, the comparison module for determining the degree of similarity of each corresponding feature set and selecting at least one corresponding feature set as a best match; and, the notification module for determining a notification component including the personal identifier of the best match and selecting a receiving node associated with the personal identifier of the best match;

wherein the notification module is configured to transmit the notification component to the selected receiving node when the best match meets a pre-selected similarity threshold.

3. The MBNS of claim 2 wherein each receiving node is associated with at least one personal identifier that is unique among the receiving nodes.

4. The MBNS of claim 3 wherein a third party subscription allows the comparison module to compare the feature set of the first content and a feature set of the third party data.

* * * * *